(12) United States Patent
Jung et al.

(10) Patent No.: US 11,884,420 B2
(45) Date of Patent: Jan. 30, 2024

(54) GIMBAL DEVICE AND FLYING APPARATUS

(71) Applicant: LG INNOTEK CO., LTD., Seoul (KR)

(72) Inventors: Moon Young Jung, Seoul (KR); Yun Sang Song, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 511 days.

(21) Appl. No.: 17/256,096

(22) PCT Filed: Feb. 25, 2019

(86) PCT No.: PCT/KR2019/002295
§ 371 (c)(1),
(2) Date: Dec. 24, 2020

(87) PCT Pub. No.: WO2020/017724
PCT Pub. Date: Jan. 23, 2020

(65) Prior Publication Data
US 2021/0269172 A1 Sep. 2, 2021

(30) Foreign Application Priority Data

Jul. 17, 2018 (KR) .......................... 10-2018-0083155

(51) Int. Cl.
*B64D 47/08* (2006.01)
*F16M 11/12* (2006.01)
(Continued)

(52) U.S. Cl.
CPC ........... *B64D 47/08* (2013.01); *F16M 11/123* (2013.01); *F16M 11/18* (2013.01); *G03B 17/561* (2013.01);
(Continued)

(58) Field of Classification Search
CPC ...... B64D 47/08; F16M 11/123; F16M 11/18; F16M 2200/041; F16M 11/10;
(Continued)

(56) References Cited

U.S. PATENT DOCUMENTS 7,623,782 B2 * 11/2009 Yu .......................... G03B 29/00
361/749
2016/0023778 A1 1/2016 Zhao et al.
(Continued)

FOREIGN PATENT DOCUMENTS

| CN | 104995090 | 10/2015 |
|---|---|---|
| CN | 105487224 | 4/2016 |

(Continued)

OTHER PUBLICATIONS

International Search Report dated Jun. 10, 2019 issued in Application No. PCT/KR2019/002295.
Chinese Office Action dated Apr. 29, 2023 issued in Application No. 201980047535.5.

*Primary Examiner* — Albert H Cutler
(74) *Attorney, Agent, or Firm* — KED & Associates LLP

(57) ABSTRACT

This gimbal device comprises: a driving unit in which a main board is disposed; a first housing coupled to the driving unit; a first motor disposed within the first housing; and a first connection unit electrically connected to the first motor. The first connection unit includes: a first region extending in a first circumferential direction along the outer circumferential surface of the first motor; a first bent region bent from the first region; and a second region extending from the first bent region in a second circumferential direction, wherein one among the first circumferential direction and the second circumferential direction is the clockwise direction, and the other is the counterclockwise direction.

20 Claims, 12 Drawing Sheets

(51) Int. Cl.
*F16M 11/18* (2006.01)
*G03B 17/56* (2021.01)
*H04N 23/50* (2023.01)
*H04N 23/57* (2023.01)

(52) U.S. Cl.
CPC ............. *H04N 23/50* (2023.01); *H04N 23/57*
(2023.01); *F16M 2200/041* (2013.01)

(58) Field of Classification Search
CPC .............. F16M 11/2071; F16M 13/02; F16M
2200/044; G03B 17/561; G03B 15/006;
G03B 29/00; H04N 23/50; H04N 23/57;
H04N 23/51; H04N 23/68; H04N 23/685;
H04N 23/695; B64U 2101/30; B64C
39/024
See application file for complete search history.

(56) References Cited

U.S. PATENT DOCUMENTS

| 2017/0336019 | A1* | 11/2017 | Liu | .................... B65H 75/4486 |
| 2017/0338639 | A1* | 11/2017 | Liu | ........................ H02G 11/02 |
| 2019/0215429 | A1* | 7/2019 | Appel | .................... F16M 13/00 |

FOREIGN PATENT DOCUMENTS

| CN | 107207098 | 9/2017 |
| CN | 206504072 | 9/2017 |
| CN | 108027098 | 5/2018 |
| KR | 10-2017-0099073 | 8/2017 |
| KR | 10-2018-0060634 | 6/2018 |
| WO | WO 2017035840 | 3/2017 |
| WO | WO 2017078254 | 5/2017 |
| WO | WO 2017/128062 | 8/2017 |

* cited by examiner

GIMBAL DEVICE AND FLYING APPARATUS

CROSS-REFERENCE TO RELATED PATENT APPLICATIONS

This application is a U.S. National Stage Application under 35 U.S.C. § 371 of PCT Application No. PCT/KR2019/002295, filed Feb. 25, 2019, which claims priority to Korean Patent Application No. 10-2018-0083155, filed Jul. 17, 2018, whose entire disclosures are hereby incorporated by reference.

TECHNICAL FIELD

The present invention relates to a gimbal device and a flying apparatus.

BACKGROUND ART

Recently, the use of a small unmanned aerial vehicle such as a drone and the like is increasing. In the case of aerial photography by attaching a camera to a small unmanned aerial vehicle, there is an advantage in that it is simple and inexpensive compared to the case of using a helicopter in which a person is boarded.

When the camera is mounted on an aerial vehicle, since the aerial vehicle rotates in three-dimension at a predetermined angle during flight, a gimbal device can be used to prevent the camera from being affected by the three-dimensional rotation of the vehicle.

The gimbal device compensates for the three-dimensional rotation of the aerial vehicle, so that the camera mounted on the aerial vehicle is not affected by the three-dimensional rotation of the aerial vehicle.

Since a gimbal device is mounted on an aerial vehicle and a camera can be used as being mounted on the gimbal device, the gimbal device is required to have an excellent camera posture retention performance and a compact, lightweight structure.

DETAILED DESCRIPTION OF THE INVENTION

Technical Subject

The present embodiment is to provide a gimbal device and a flying apparatus capable of compactly arranging components inside the housing by improving the structure so that the overall size of a product can be reduced.

Technical Solution

A gimbal device according to the present embodiment comprises: a driving unit in which a main board is disposed; a first housing coupled to the driving unit; a first motor disposed inside the first housing; and a first connection unit electrically connected to the first motor, wherein the first connection unit includes: a first region extending in a first circumferential direction along the outer circumferential surface of the first motor; a first bent region bent from the first region; and a second region extending from the first bent region in a second circumferential direction, and wherein one of the first circumferential direction or the second circumferential direction is a clockwise direction and the other is a counterclockwise direction.

The first connection unit may include a second bent region bent from the second region and a third region extending in the first circumferential direction from the second bent region.

The first housing may include a first protrusion protruding from a bottom surface on which the first motor is disposed and coupled to an inner circumferential surface of the first bent region, and a second protrusion coupled to an inner circumferential surface of the second bent region.

The first protrusion and the second protrusion may have different linear distances from the first motor.

A portion of an outer circumferential surface of the first motor may not be overlapped with the first connection unit in a radial direction of the first motor.

A first frame including a second housing and a second motor disposed in the second housing, and having one end coupled to the first housing and the other end coupled to the second housing may be included.

According to the operation of the first motor, the first frame may rotate in a first direction.

The second region may be longer than the first region.

It may include a second connection unit electrically connected to the second motor, wherein the second connection unit includes a fourth region extending in a first circumferential direction along an outer circumferential surface of the second motor, a third bent region bent from the fourth region, and a fifth region extending in a second circumferential direction from the third bent region, and wherein one of the first circumferential direction or the second circumferential direction is a clockwise direction and the other may be a counterclockwise direction.

It may include a third housing and a third motor disposed inside the third housing, and may include a second frame connecting the second housing and the third housing.

It may include a third connection unit electrically connected to the third motor, wherein the third connection unit includes a seventh region extending in a first circumferential direction along an outer circumferential surface of the third motor, a fifth bent region bent from the seventh region, and an eighth region extending in a second circumferential direction from the fifth bent region, and wherein one of the first circumferential direction or the second circumferential direction is a clockwise direction and the other may be a counterclockwise direction.

The second frame may rotate according to the operation of the second prime mover unit.

The first to third connection units may be flexible circuit boards.

One end of the first connection unit is electrically connected to the driving unit, and the other end may be electrically connected to the second motor.

A gimbal device according to another embodiment comprises: a main body; a motor unit disposed on one side of the main body and supporting the main body; and a gimbal device disposed on the other side of the main body, wherein the gimbal device includes: a driving unit on which a main substrate is disposed; a first housing coupled to the driving unit; a first motor disposed inside the first housing; and a first connection unit electrically connected to the first motor, wherein the first connection unit includes: a first region extending in a first circumferential direction along an outer circumferential surface of the first motor; a first bent region bent from the first region; and a second region extending from the first bent region in a second circumferential direction, and wherein one of the first circumferential direction or the second circumferential direction is a clockwise direction and the other may be a counterclockwise direction.

Advantageous Effects

According to the present embodiment, since a connection unit for electrical connection between other components is disposed to cover a portion of the outer circumferential surface of a motor and can be rotated together, there is an advantage that the overall length of the connection unit can be shortened.

Due to this, there is an advantage in that the electrical stability can be increased, manufacturing cost is reduced, and the overall size of the product can be reduced.

BRIEF DESCRIPTION OF DRAWINGS

FIG. 2 is a view in which FIG. 1 is rotated around a first axis A1.

BEST MODE

Hereinafter, preferred embodiments of the present invention will be described in detail with reference to the accompanying drawings.

However, the technical idea of the present invention is not limited to some embodiments to be described, but may be implemented in various different forms, and within the scope of the technical idea of the present invention, one or more of the constituent elements may be selectively combined and substituted between the embodiments and used.

In addition, terms (including technical and scientific terms) used in the embodiments of the present invention can be interpreted as meanings generally understood by those of ordinary skill in the art, unless explicitly defined and described, and terms commonly used, such as terms defined in the dictionary, may be interpreted in consideration of the meaning of the context of the related technology.

In addition, terms used in the embodiments of the present invention are for describing the embodiments and are not intended to limit the present invention. In the present specification, the singular form may include the plural form unless specifically stated in the phrase, and when described as "at least one (or more than one) of A, B, and C", it may include one or more of all possible combinations that can be combined with A, B, and C.

In addition, terms such as first, second, A, B, (a), and (b) may be used in describing components of the embodiment of the present invention.

These terms are only for distinguishing the component from other components, and are not limited to the nature, order, or order of the component by the term.

And, when a component is described as being 'connected', 'coupled' or 'interconnected' to another component, the component is not only directly connected, coupled or interconnected to the other component, but also it may include a case of being 'connected', 'coupled' or 'interconnected' due to another component between the component and the other component.

In addition, when it is described as being formed or disposed on the "top (upper side) or bottom (lower side)" of each component, the top (upper side) or bottom (lower side), it includes not only the case where the two components are in direct contact with each other, but also includes the case where one or more other components are formed or disposed between two components. In addition, when expressed as "top (upper side) or bottom (lower side)", it includes the meaning of not only an upward direction but also may include the meaning of a downward direction with reference to one component.

Figure 1:
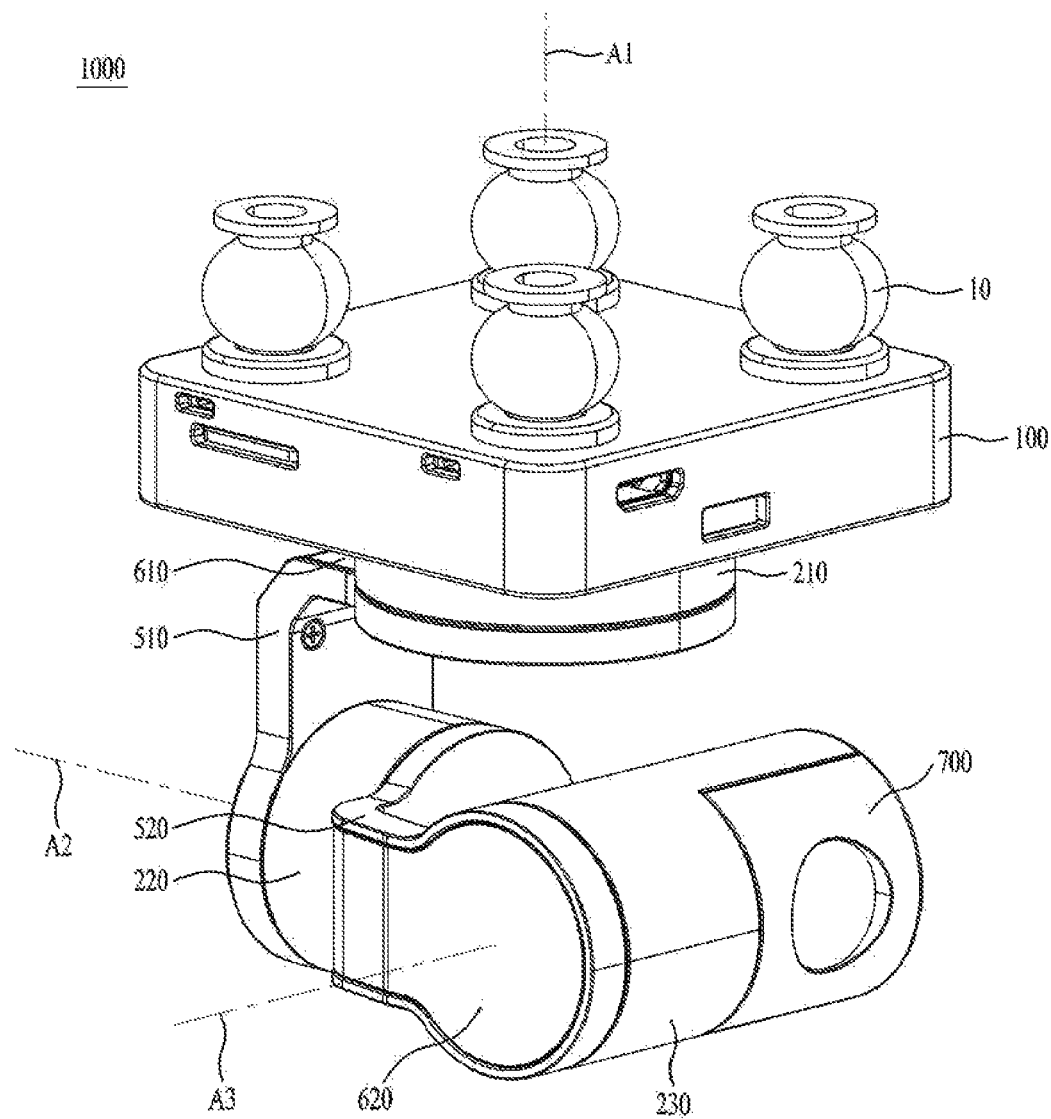
FIG. 1 is a perspective view of a gimbal device according to an embodiment of the present invention.
Figure 2:
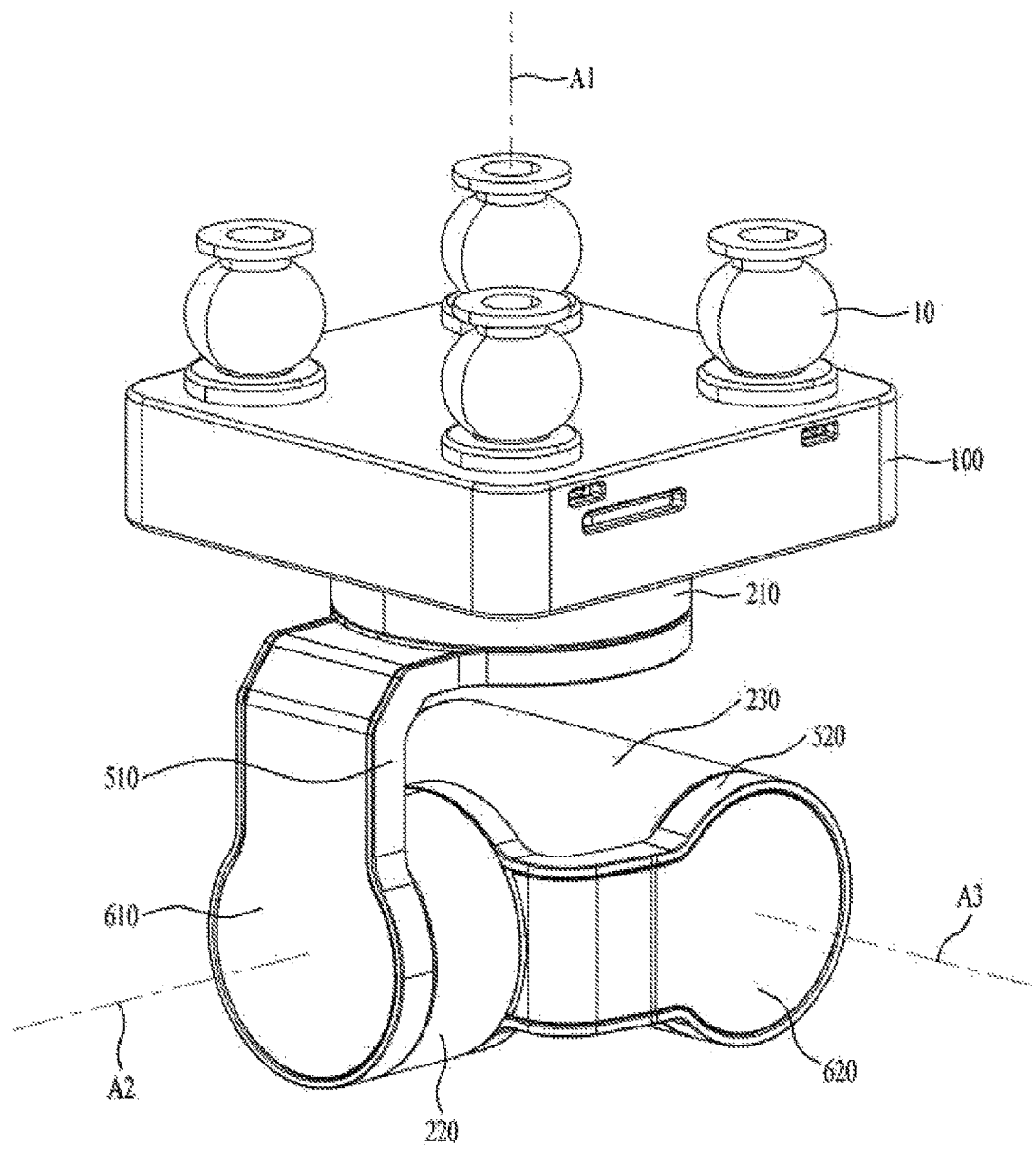
Figure 3:
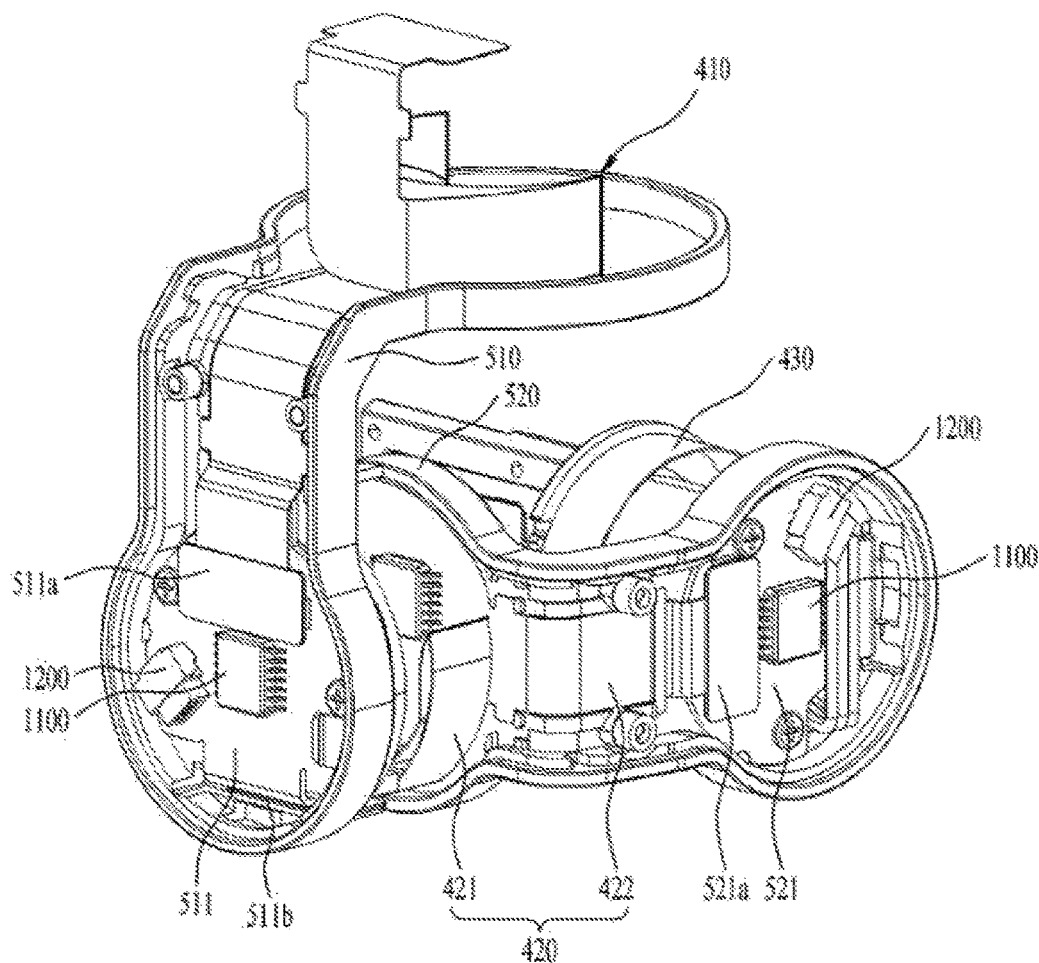
FIG. 3 is a view illustrating FIG. 2 in which some configurations are removed.
Figure 4:
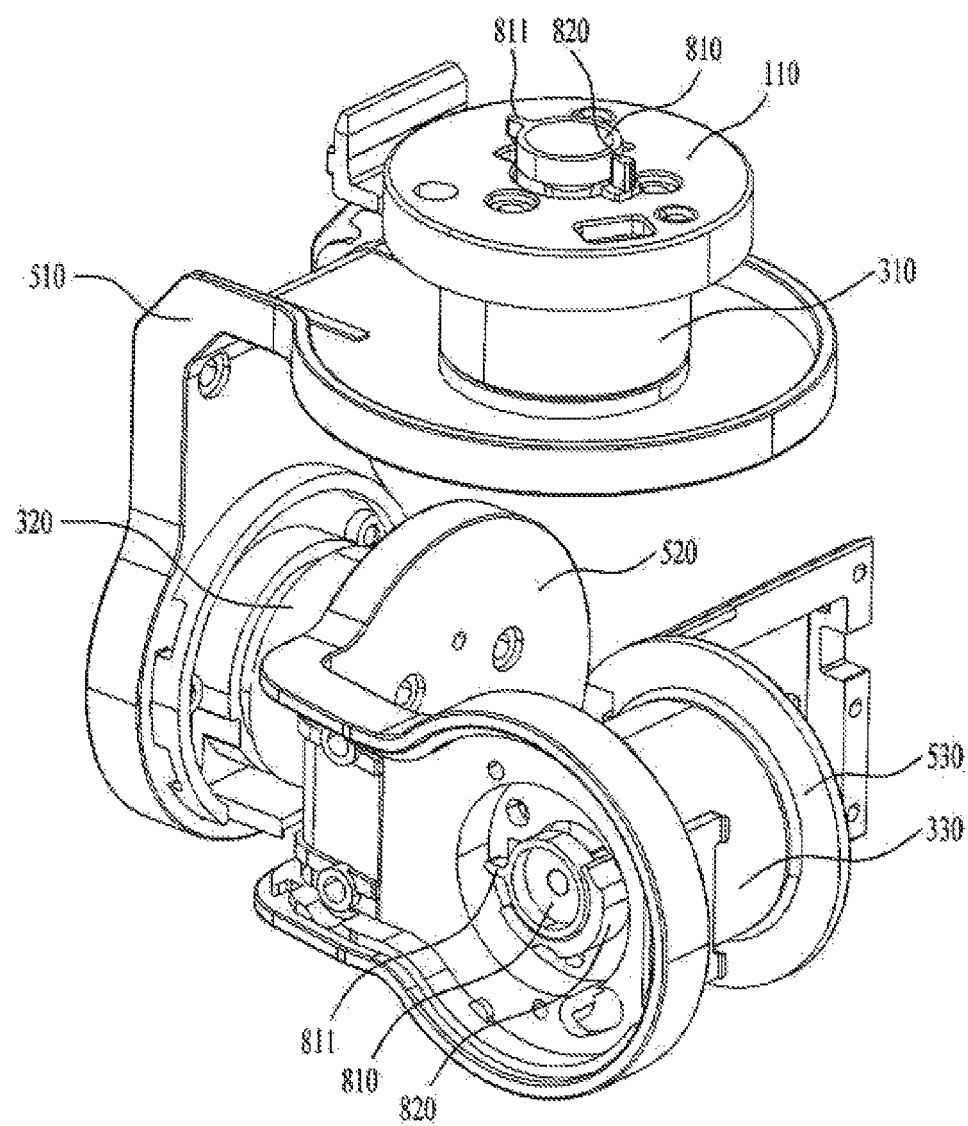
FIG. 4 is a diagram illustrating a structure of a first frame to a third frame according to an embodiment.
Figure 5:
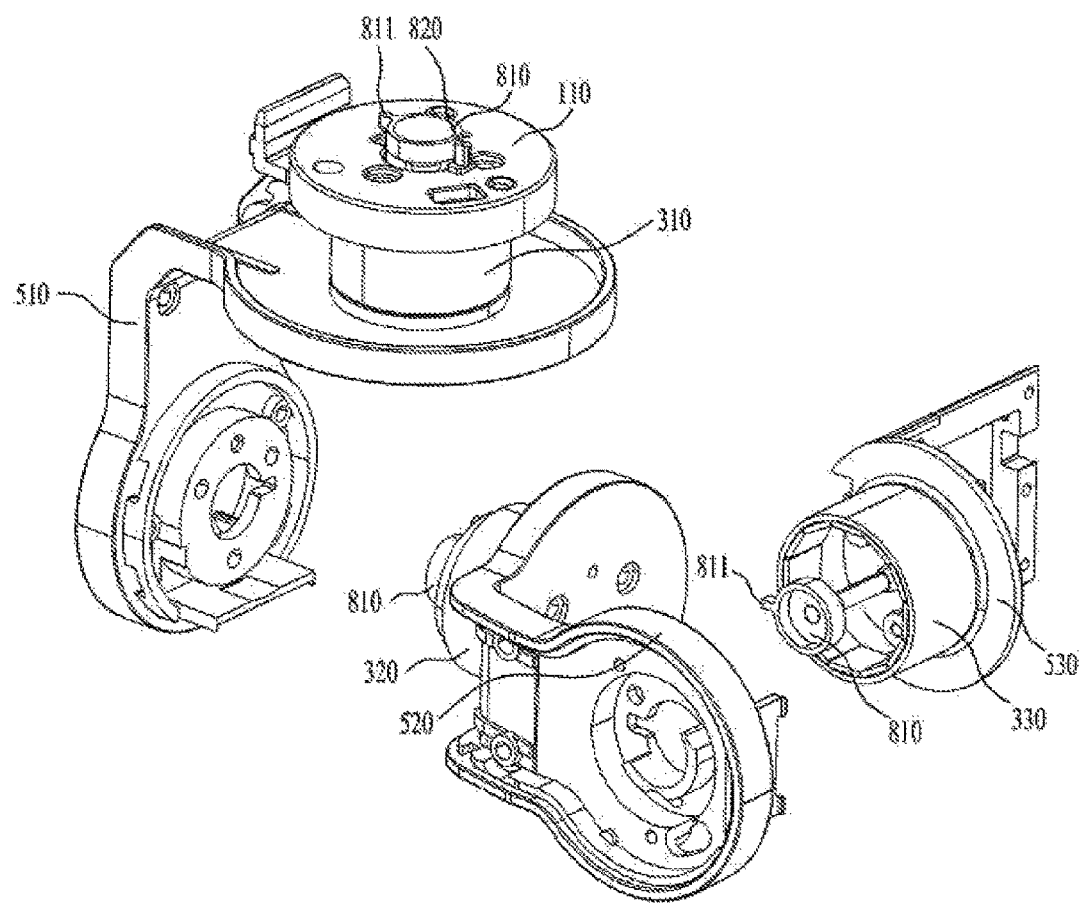
FIG. 5 is an exploded perspective view of FIG. 4.

FIG. 1 is a perspective view of a gimbal device according to an embodiment of the present invention; FIG. 2 is a view in which FIG. 1 is rotated about a first axis A1; FIG. 3 is a view illustrating FIG. 2 in which some configurations are removed; FIG. 4 is a diagram showing a structure of a first frame to a third frame; and FIG. 5 is an exploded perspective view of FIG. 6.

Referring to FIG. 1, in a gimbal device 1000 according to an embodiment of the present invention, a camera 700 is mounted, and the gimbal device 1000 itself may be mounted on an aerial vehicle such as a drone and the like. The camera 700 of the gimbal device 1000 may maintain its original posture regardless of the three-dimensional rotation of an aerial vehicle.

The gimbal device 1000 may be rotated in three-dimension. That is, the gimbal device 1000 may include a portion rotating around a first axis A1, a portion rotating around a second axis A2 perpendicular to the first axis A1, and a portion rotating around a third axis A3 perpendicular to the first axis A1 and the second axis A2.

Due to such a structure, the gimbal device 1000 is capable of three-dimensional rotation, and when an aerial vehicle rotates in three-dimension, the gimbal device 1000 performs a three-dimensional rotation to compensate for the rotation of the aerial vehicle, so that the camera 700 mounted on the gimbal device 1000 can maintain its original posture regardless of the three-dimensional rotation of the aerial vehicle.

As illustrated in FIGS. 4 and 5, the gimbal device 1000 may include a first frame 510, a second frame 520, a third frame 530, and a driving unit 100.

The first frame 510 may have a generally bent shape, and one side of a bent portion may be mounted on the driving unit 100, and the second frame 520 may be mounted on the other side in the direction of the second axis A2. The first frame 510 may rotate around the first axis A1 with respect to the driving unit 100 by the operation of a first motor 310.

The second frame 520 also has a generally bent shape, and one side of the bent portion is mounted on the first frame 510, and the third frame 530 may be mounted on the other side in the direction of the third axis A3. The second frame 520 may rotate around the second axis A2 with respect to the first frame 510 by the operation of a second motor 320.

One side of the third frame 530 may be mounted on the third frame 530, and the camera 700 may be mounted thereon. The third frame 530 may rotate around the third axis A3 with respect to the third frame 530 by the operation of a third motor 330.

The driving unit 100 is electrically connected to the first motor 310 to the third motor 330, controls the operation of the first motor 310 to the third motor 330, and may supply a current required for their operation.

The driving unit 100 may control the first motor 310 to the third motor 330 as follows. First, the driving unit 100 may control the first motor 310 to the third motor 330 to maintain the posture of the camera 700.

That is, when the vehicle rotates in three-dimension, the camera 700 mounted on an aerial vehicle, a yaw rotating at a predetermined angle around the first axis A1 and a roll rotating at a predetermined angle around the second axis A2, and a pitch rotating at a predetermined angle around the third axis A3 are generated.

The driving unit 100 controls the rotation angle of the first motor 310 to the third motor 330 to correct the yaw, roll, and pitch of the camera 700, so that even when the aerial vehicle rotates in three-dimension, the camera 700 mounted thereon can maintain its original posture.

In addition, the driving unit 100 may actively control the first motor 310 to the third motor 330 to control the photographing direction of the camera 700. That is, the driving unit 100 controls the first motor 310 to the third motor 330 to rotate the first frame 510 to the third frame 530 by a desired angle, so that the photographing direction of the mounted camera 700 can be adjusted.

Referring to FIGS. 1 and 2, the gimbal device 1000 may include a damper 10, a first housing 210 to a third housing 230, a first cover 610, and a second cover 620.

The damper 10 may be disposed at a joint portion between the gimbal device 1000 and the aerial vehicle, so as to mitigate an impact applied to the gimbal device 1000 from the aerial vehicle. The damper 10 may be provided as many as necessary at a required position at a joint portion between the gimbal device 1000 and the aerial vehicle.

The first housing 210 may rotate around the first axis A1 with respect to the driving unit 100, and a first motor 310 may be disposed therein. One end of the first housing 210 may be coupled to the driving unit 100 and the other end may be coupled to the first frame 510.

The first housing 210 is fixed to the driving unit 100, and thus, the first frame 510 may rotate around the first axis A1 by the operation of the first motor 310. In addition, the first housing 210 and the first frame 510 may be integrally formed, and the first housing 210 may rotate around the first axis A1 together with the first frame 510.

The upper end of the first housing 210 is coupled to a lower surface of the driving unit 100, and the lower end of the first housing 210 is coupled to an upper surface of the first frame 510.

The second housing 220 rotates around a second axis A2 perpendicular to the first axis A1 with respect to the first housing 210, and a second motor 320 may be disposed therein. One end of the second housing 210 may be coupled to the first frame 510 and the other end may be coupled to the second frame 520.

The second housing 220 is fixed to the first frame 510, and thus, the second frame 520 may rotate around the second axis A2 by the operation of the second motor 320. In addition, the second housing 220 and the second frame 520 may be integrally formed, and the second housing 220 may rotate around the second axis A2 together with the second frame 520.

One end of the second housing 220 may be coupled to one surface of the first frame 510 and the other surface of the second housing 220 may be coupled to one surface of the second cover 620 or the second frame 520.

The third housing 230 rotates around a third axis A3 perpendicular to the first axis A1 and the second axis A2 with respect to the second housing 220, and a third motor 330 is disposed inside thereof, and the camera 700 may be mounted on the third frame 530. One end of the third housing 230 may be coupled to the second frame 520.

The third housing 230 is coupled to the second frame 520, and thus the third frame 530 may rotate around the third axis A3 by the operation of the third motor 330. In addition, the third housing 230 and the third frame 530 may be integrally formed, and the third housing 230 may rotate around the third axis A3 together with the third frame 530.

Since the camera 700 is mounted on the third frame 530, as the first frame 510 to the third frame 530 rotates around the first axis A1 to the third axis A3, respectively, the camera 700 may also rotate around the first axis A1 to the third axis A3.

The first cover 610 may be coupled to the first frame 510 to cover a portion of a second motor control unit 511 and the first connection unit 410. That is, when the first cover 610 is coupled to the first frame 510, a space may be formed between the first cover 610 and the first frame 510, and the second motor control unit 511 and a portion of the first connection unit 410 are accommodated, and the first cover 610 may cover a portion of the second motor control unit 511 and the first connection unit 410 to protect them.

The second cover 620 may be coupled to the second frame 520 to cover a portion of the third motor control unit 521 and the second connection unit 420. Like the first cover 610, when the second cover 620 is coupled to the second frame 520, a space may be formed between the second cover 620 and the second frame 520, and a portion of the third motor control unit 521 and the second connection unit 420 is accommodated in the space, and the second cover 620 covers the third motor control unit 521 and the second connection unit 420 to protect them.

Figure 6:
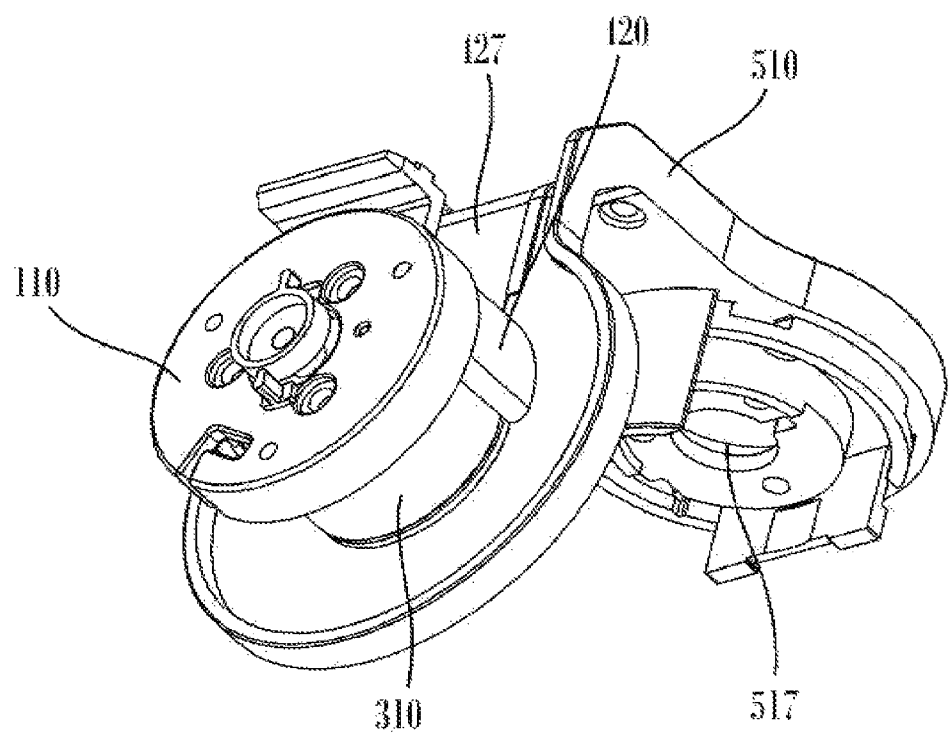
FIG. 6 is a perspective view of a first frame according to an embodiment of the present invention.
Figure 7:
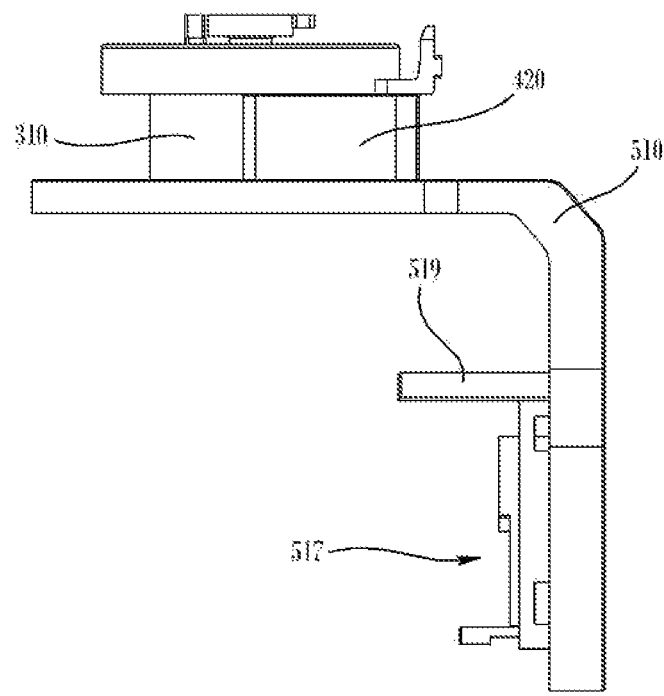
FIG. 7 is a cross-sectional view showing a side surface of a first frame according to an embodiment of the present invention.
Figure 8:
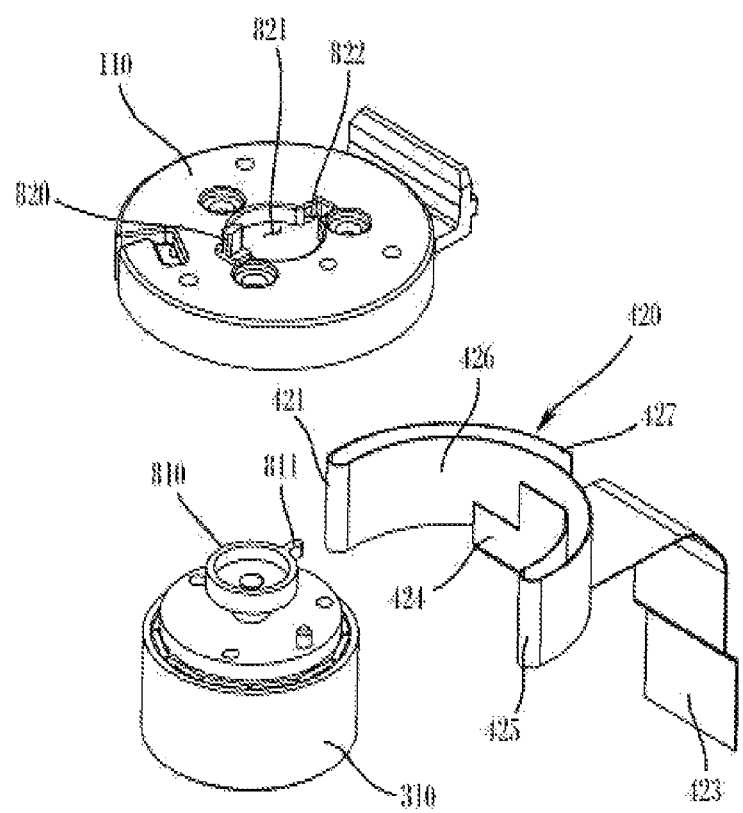
FIG. 8 is an exploded perspective view of a first frame according to an embodiment of the present invention.
Figure 8:
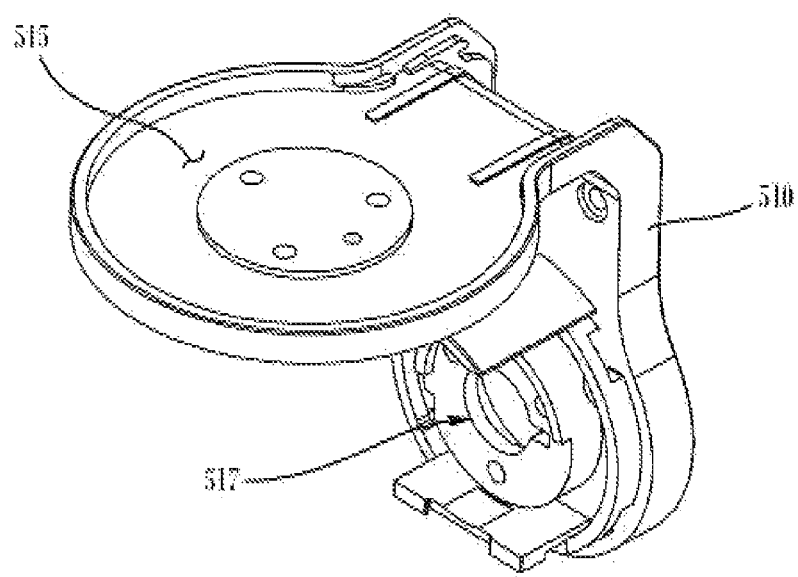
Figure 9:
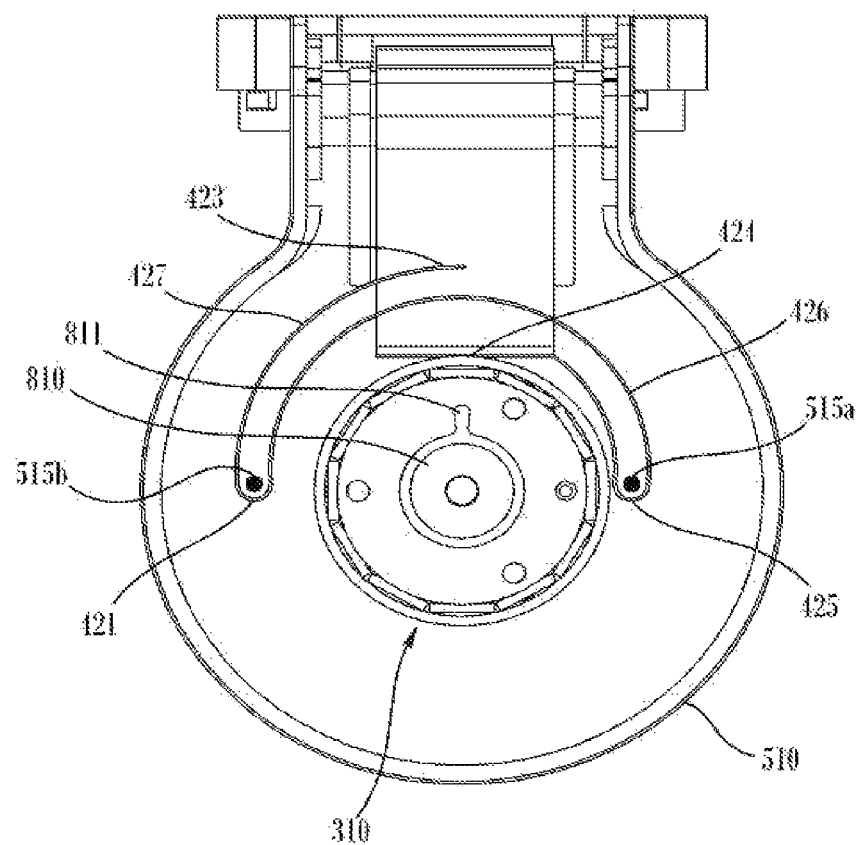
FIG. 9 is a cross-sectional view showing an arrangement structure of a first motor and a first connection unit according to an embodiment of the present invention.
Figure 10:
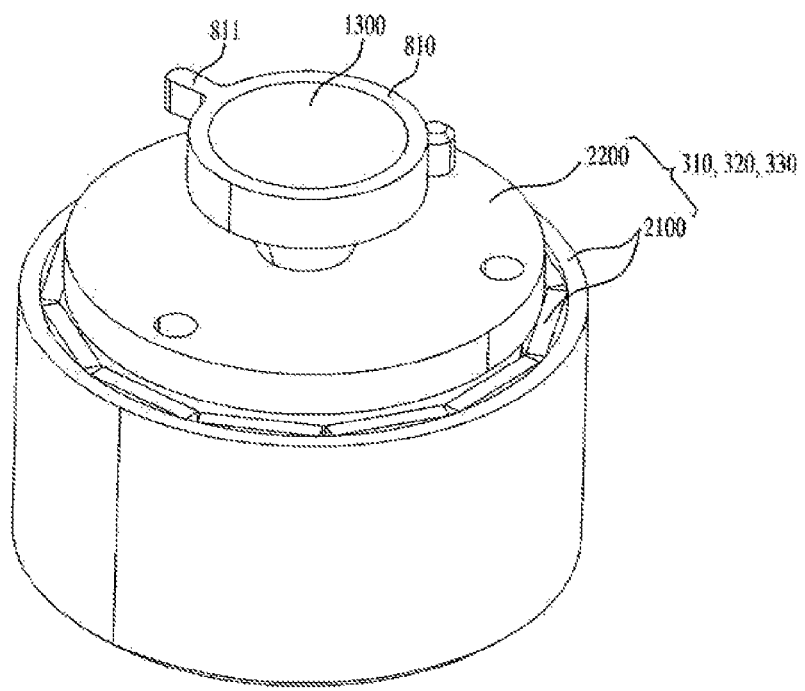
FIG. 10 is a perspective view of a first motor according to an embodiment of the present invention.

FIG. 6 is a perspective view of a first frame according to an embodiment of the present invention, FIG. 7 is a cross-sectional view showing the side surface of a first frame according to an embodiment of the present invention, FIG. 8 is an exploded perspective view of a first frame according to an embodiment of the present invention, FIG. 9 is a cross-sectional view showing an arrangement structure of a first motor and a first connection unit according to an embodiment of the present invention, and FIG. 10 is a perspective view of a first motor according to an embodiment of the present invention.

FIGS. 3, and 6 to 9, the connection unit may be electrically connected to the driving unit 100 and may include a first connection unit 410 to a third connection unit 430.

The first connection unit 410 may be disposed between the first motor 310 and the first housing 210 to cover a portion of the outer circumferential surface of the first motor 310. The second connection unit 420 may be disposed between the second motor 320 and the second housing 220 so as to cover a portion of the outer circumferential surface of the second motor 320. The third connection unit 430 may be disposed between the third motor 330 and the third housing 230 to cover a portion of the outer circumferential surface of the third motor 330.

The first connection unit 410, the second connection unit 420, and the third connection unit 430 are formed of a flexible material, and may be electrically connected to the driving unit 100. That is, the first connection unit 410, the second connection unit 420 and the third connection unit 430 are sequentially electrically connected to each other, and the first connection unit 410 may be electrically connected to the driving unit 100. For example, the first to third connection units 410, 420, and 430 may be a flexible printed circuit board (FPCB).

For example, the first connection unit 410 electrically connects the driving unit 100 and the first motor 310, and the second connection unit 420 electrically connects the first motor 310 and the second motor, and the third connection unit 430 may electrically connect the second motor 320 and the third motor 330.

The central portion of the connection unit is provided in a form surrounding a portion of the outer circumferential surface of the motor and is disposed inside the housing, and both ends may be electrically connected to the driving unit 100, the motor control unit, or the camera 700. Some portions connected to the motor control unit of the connection unit may be accommodated in the housing, and other portions may be accommodated in the cover.

Specifically, one end of both ends of the first connection unit 410 may be electrically connected to the driving unit 100 and the other end may be electrically connected to the second motor control unit 511. At this time, a portion of the first connection unit 410 connected to the second motor control unit 511 may be accommodated in the first cover 610.

Both ends of the second connection unit 420 may have one end electrically connected to the second motor control unit 511, and the other end may be electrically connected to the third motor control unit 521. At this time, a portion of the second connection unit 420 connected to the second motor control unit 511 is accommodated in the second housing 220, and a portion connected to the third motor control unit 521 may be accommodated in the second cover 620.

Both ends of the third connection unit 430 may have one end connected to the third motor control unit 521, and the other end may be electrically connected to the camera 700. At this time, all of a portion of the third connection unit 430 connected to the third motor control unit 521 and a portion connected to the camera 700 may be accommodated in the third housing 230.

A separation space may be formed between the housing and the motor. The separation space may be formed between the inner side surface of the housing and the outer circumferential surface of the motor. A connection unit may be disposed in the separation space.

The connection unit may be, for example, may be provided with a first connection unit 410 disposed in a separation space between the first housing 210 and the first motor 310, a second connection unit 420 disposed in a separation space between the second housing 220, and the second motor 320, and a third connection unit 430 disposed in a separation space between the third housing 230 and the third motor 330.

That is, separation spaces are formed in each of the separation spaces between the first housing 210 and the first motor 310, the second housing 220 and the second motor 320, and the third housing 230 and the third motor 330, and the center portions of the first connection unit 410, the second connection unit 420, and the third connection unit 430 may be accommodated in the separation spaces.

The connection portion is disposed to cover a portion of the outer circumferential surface of the motor, and may be provided with a soft material so as to be deformable in the circumferential direction and the radial direction of the motor.

Hereinafter, a wound type of the first connection unit 410 among the connection units will be described in detail with reference to FIGS. 6 to 10. Since a wound type of the second connection unit 420 and the third connection unit 430 is the same as that of the first connection unit 410, a redundant description thereof will be omitted.

As illustrated in FIG. 10, the first motor 310 may include a rotor 2100 and a stator 2200. At this time, the stator 2200 is disposed at an inner side thereof, and the rotor 2100 is disposed at an outer side of the stator 2200. Accordingly, the first connection unit 410 may be wound in the circumferential direction of the rotor 2100 in a separation space between the outer circumferential surface of the rotor 2100 and the inner side surface of the first housing 210. The first housing 210 may be disposed to surround the first connection unit 410 in a shape corresponding to an arc-shaped protruded portion of the first frame 510.

Since the first connection unit 410 may be provided with a plurality of circuits or conductors for electrical connection, and is provided so as to be easily deformable, for example, the first connection unit 410 may be formed of a flexible circuit board (FPCB), a connection wiring, a flexible board, a wire, and the like.

Likewise, the second connection unit 420 and the third connection unit 430 may also have a plurality of circuits or conductors for electrical connection, and are provided so as to be easily deformable, for example, each of the second connection unit 420 and the third connection unit 430 may include a flexible circuit board (FPCB), a connection wiring, a flexible board, and a wire.

The first connection unit 410 may include a first movable portion that is being wound or being unwound along the periphery of the first motor 310 and a first fixing portion fixed to the first frame. Here, the first movable portion is understood as an area surrounding the outer circumferential surface of the first motor 310, and the first fixing portion is understood as an area in which the first motor 310, the driving unit 100, and terminals that are electrically connected to the second motor control unit 511 are disposed.

In detail, referring to FIGS. 8 and 9, the first connection unit 410 includes a first region 424 having one end extending in a first circumferential direction along the outer circumferential surface of the first motor 310, a second region 426 that is bent from the other end of the first region 424 and extends in a second circumferential direction opposite to the first circumferential direction, and a third region 427 bent from the other end of the second region 426 and being extended in a first circumferential direction. For example, the first circumferential direction may be a clockwise or counterclockwise direction, and the second circumferential direction may be a counterclockwise or clockwise direction.

Accordingly, a first bent region 425 is disposed between the first region 424 and the second region 426, and a second bent region 421 is disposed between the second region 426 and the third region 427. An area of the first connection unit 410 forming the first bent region 425 and the second bent region 421 may be varied according to the driving of the first motor 310.

With the above configuration, a portion of the outer circumferential surface of the first motor 310 may not overlap with the first connection unit 410 in a radial direction. In addition, the length of the second region 426 in a circumferential direction may be longer than the length of the first region 424 or the third region 427 in a circumferential direction.

The first connection unit 410 has one end connected to the driving unit 100 and the other end connected to the second motor control unit 511 to electrically connect the driving unit 100 and the second motor control unit 511. In addition, at least a portion of the first connection unit 410 may be protruded outward, and an extension portion may be formed to be electrically connected to a stator 2200 of the first motor 310. Accordingly, the driving unit 100, the first motor 310, and the second motor 320 can be electrically connected to each other.

On the other hand, in a region of the first frame 510 in which the first motor 310 and the first connection unit 410 are disposed, a first protrusion 515a protruding upward from the bottom surface and contacting the inner surface of the first bent region 425 and a second protrusion 515b contacting the inner surface of the second bent region 421 may be provided. The first protrusion 515a and the second protrusion 515b have an outer circumferential surface in contact with the inner circumferential surface of the first bent region 425 and the second bent region 421, respectively, so that when the first motor 310 is rotating, the position of any one of the bent regions can be fixed.

The first protrusion 515a and the second protrusion 515b may have the same linear distance from the first motor 310. In contrast, the first protrusion 515a and the second protrusion 515b may have different linear distances from the first motor 310.

In detail, as the first motor 310 rotates, the inner circumferential surface of the first connection unit 410 may be in contact with an outer circumferential surface of the first motor 310 or may be spaced apart from an outer circumferential surface of the first motor 310. That is, since both ends of the first connection unit 410 are fixedly coupled to the driving unit 100 and the second motor control unit 511, respectively, when the first frame 510 is rotated in a first axis direction with respect to the driving unit 100, the distance between the first bent region 425 and the second bent region 421 may be changed.

In other words, depending on the rotation of the first motor 310, the first bent region 425 and the second bent region 421 can be tightly wound in the first protrusion 515a and the second protrusion 515b or spaced apart therefrom, respectively.

That is, when the first motor 310 rotates in a clockwise direction, the first bent region 425 moves in a clockwise direction, and the second bent region 421 is guided by the second protrusion 515b the area of the first connection unit 410 may be moved from the third region 427 to the second region 426. In addition, when the first motor 310 rotates in a counterclockwise direction, the second bent region 421 moves in a counterclockwise direction, and the first bent region 425 is guided by the first protrusion 515a, and thus, the area of the first connection unit 410 may be moved from the second region 426 to the first region 424.

With the above configuration, since the first connection unit 410 can be rotated together with the rotation of the first motor 310 even if it is not disposed to cover the entire outer circumferential surface of the first motor 310, there is an advantage in that the overall length of the connection unit 410 can be shortened. As the length of the flexible board for electrical connection becomes longer, the risk of electrical noise becomes higher. In addition, the manufacturing cost may increase by the increased length. However, according to the present embodiment, since the overall length of the first connection unit 410 can be reduced, the stability of the electrical connection is enhanced, the manufacturing cost is reduced, and the overall size of the product can be reduced. This is due to a decrease in the number of turns of the first connection unit 410 surrounding the first motor 310.

Meanwhile, when considering the rotation angle of the first motor 310, with reference to the center of the first motor 310, the first bent region 425 and the second bent region 421 can be disposed to form a relative angle between 160 degrees and 200 degrees. This is because even with the value in the above described range, the first motor 310 can form a rotation radius of approximately 360 degrees.

Likewise, the second connection unit 420 may include a fourth region whose one end is being extended in a first circumferential direction along the outer circumferential surface of the second motor 320, a fifth region bent from the other end of the fourth region and being extended in a second circumferential direction which is an opposite direction, and a sixth region bent from an extended end of the fifth region and being extended in the first circumferential direction.

Accordingly, a third bent region is disposed between the fourth region and the fifth region, and a fourth bent region is disposed between the fifth region and the sixth region.

In addition, the third connection unit 430 may include a seventh region whose one end is being extended in a first circumferential direction along an outer circumferential surface of the third motor 330, an eighth region bent from the other end of the seventh region and being extended in a second circumferential direction which is an opposite direction, and a ninth region bent from an extended end portion of the eighth region and being extended in the first circumferential direction.

Accordingly, a fifth bent region is disposed between the seventh region and the eighth region, and a sixth bent region is disposed between the eighth region and the ninth region.

In the embodiment, each component of the gimbal device 1000 is electrically connected by the first connection unit 410 to the third connection unit 430, and a separate connection line for electrically connecting each component, for example, a connection line for camera image data transmission and a power connection line for current supply are unnecessary. Therefore, since the three-axis rotation device of the embodiment has a compact electrical connection structure, there is an effect of miniaturizing the device and increasing durability.

In the embodiment, each connection unit is accommodated in a space formed by the first housing 210 to the third housing 230 and the first frame 510 to the third frame 530, and external exposure can be blocked by each of the housings, each frame, the first cover 610, and the second cover 620.

Due to this structure, each connection unit can minimize contact with moisture and other foreign substances due to an external exposure, thereby improving the durability of the gimbal device 1000 of the embodiment.

Meanwhile, the gimbal device 1000 may be provided with a motor, and the motor may include a first motor 310, a second motor 320, and a third motor 330.

The first motor 310 may be mounted on the driving unit 100 so as to rotate around the first axis A1 with respect to the driving unit 100. As the first motor 310 rotates, the first frame 510 coupled to the first motor 310 may rotate around the first axis A1.

Referring to FIGS. 4 and 5, the driving unit 100 may include a mounting member 110 so that the first motor 310 is rotatable with respect to the driving unit 100. The first motor 310 may be coupled to the mounting member 110 so as to be rotatable with respect to the mounting member 110, and the mounting member 110 may be fixedly coupled to the driving unit 100.

Meanwhile, a first motor control unit (not shown) may be provided in the driving unit 100. The first motor control unit may control the first motor 310 to rotate around the first axis A1.

The second motor 320 may be mounted on the first frame 510 to rotate around the second axis A2 with respect to the first frame 510. A second motor mounting part 517 (refer to FIG. 6) may be provided in a region of the first frame 510 to which the second motor 320 is coupled. The second motor mounting part 517 may be formed with a hole so that a stopper 810, which will be described later, may be penetrating therethrough. Accordingly, as the second motor 320 rotates, the second frame 520 coupled to the second motor 320 may rotate around the second axis A2.

The third motor 330 may be mounted on the second frame 520 to rotate around a third axis A3 with respect to the second frame 520. As the third motor 330 rotates, the third frame 530 coupled to the third motor 330 may rotate around the third axis A3.

The second motor control unit 511 may be mounted on the first frame 510 to control the operation of the first motor 310. That is, in the first frame 510, a second motor control unit 511 that controls the operation of the second motor 320 may be mounted at a position corresponding to the second motor 320 and the second axis A2 direction.

The third motor 330 may be mounted on the second frame 520 to control the operation of the second motor 320. That is, in the second frame 520, a third motor 330 for controlling the operation of the third motor 330 can be mounted at a position corresponding to the third motor 330 in the direction of the third axis A3.

Referring to FIG. 3, the second motor control unit 511 may include a first connector 511a coupled to the first connection unit 410 and a second connector 511b coupled to the second connection unit 420. At this time, the second connector 511b may be coupled to a portion formed by bending and extending in the direction of the second axis A2 of the second motor control unit 511.

Referring to FIG. 3, the second motor control unit 511 may include a first connector 511a coupled to the first connection unit 410 and a second connector 511b coupled to the second connection unit 420. At this time, the second connector 511b may be coupled to a portion formed by bending and extending in the direction of the second axis A2 of the second motor control unit 511.

Hereinafter, the third motor control unit 521 will be described in detail with reference to FIG. 11. The second motor control unit 511 is also structurally very similar to the third motor control unit 521, so a redundant description thereof will be omitted.

Figure 11:
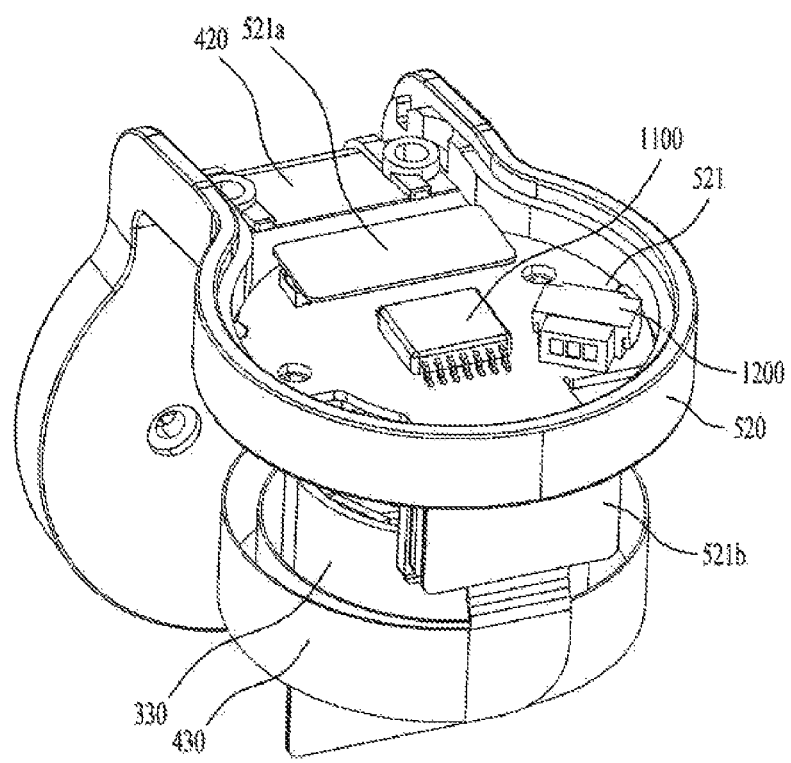
FIG. 11 is a view showing a third motor control unit according to an embodiment of the present invention.

FIG. 11 is a view showing a third motor control unit according to an embodiment of the present invention.

Referring to FIG. 11, the third motor control unit 521 may be provided as a circuit board provided with various elements and circuits for controlling the rotation angle, rotation direction, and rotation speed of the third motor 330.

As an element for controlling the third motor 330, for example, a motor control sensor 1100 may be provided in the third motor control unit 521. The motor control sensor 1100 will be described in detail below.

The third motor control unit 521 can be provided with the motor control sensor 1100 disposed on one surface thereof is facing the sensing magnet 1300 provided in the third motor 330 and facing the motor in the direction of the third axis A3.

In addition, the third motor control unit 521 is provided as a circuit board and is accommodated in an accommodation space formed by the second frame 520 and the second cover 620, thereby reducing the space in which the third motor control unit 521 is provided, and thus the gimbal device 1000 can be miniaturized. In addition, external exposure of the third motor control unit 521 can be prevented by covering the third motor control unit 521 with the second cover 620.

Meanwhile, a cable connection unit 1200 may be provided in the third motor control unit 521. The third motor 330 and the third motor control unit 521 may be electrically connected by the cable. Accordingly, the cable connection unit 1200 is a device for connecting the cable to the third motor 330.

The third connector 521a serves to electrically connect the second connection unit 420 and the third motor control unit 521 by coupling one side of the second connection unit 420. The fourth connector 521b serves to electrically connect the third connection unit 430 and a camera 7000 by coupling one side of the third connection unit 430.

The third connector 521a and the fourth connector 521b may be socket coupled to the third motor control unit 521. After coupling, the third connector 521a and the fourth connector 521b may be fixed to the third motor control unit 521 using an adhesive.

The third connector 521a and the fourth connector 521b may facilitate coupling between the third motor control unit 521 and the connection unit and assembling of components. That is, since the third motor control unit 521 and the connection units are not integrally formed, but are separately manufactured and coupled with each other to assemble the gimbal device 1000, assembling of the gimbal device 1000 may be facilitated.

Meanwhile, the fourth connector 521b is bent in the direction of the third axis A3 and extended from the third motor control unit 521 to be coupled to a portion formed. Accordingly, the fourth connector 521b is disposed in which the wound central portion of the third connection unit 430 is disposed, so that it can be placed in a space different than the space formed by the second frame 520, in which the third motor control unit 521 is disposed, and the second cover 620.

In order to electrically connect the third motor 330 and the fourth connector 521b, a through hole may be formed in a portion of the second frame 520 corresponding to a portion where the fourth connector 521b is disposed.

Due to this structure, the area of the third motor control unit 521 provided as a circuit board can be widened, so that more elements and circuits can be formed in the third motor control unit 521.

Referring back to FIG. 10, the motor may include a rotor 2100 which is a rotating part and a stator 2200 which is a non-rotating part. The stator 2200 may be provided inside the motor, and the rotor 2100 may be provided to surround the stator 2200.

Each frame and housing may be fixedly coupled to the rotor 2100. Accordingly, each frame and the housing may rotate in the direction of the first axis A1 to the third axis A3 by the rotation of the rotor 2100.

Referring to FIGS. 4, 8, and 10, a first stopper 810 may be provided in the rotor 2100.

The first stopper 810 may be disposed above the stator 2200 as illustrated in FIG. 9. A pole protruding in the direction of the third axis A3 is provided in the central portion of the rotor 2100, and the first stopper 810 may be fixedly coupled to the pole.

Accordingly, the first stopper 810 may rotate in the axial direction according to the rotation of the rotor 2100. The first stopper 810 may be provided with a total of three coupled to each of the first motor 310 to the third motor 330.

As the rotor 2100 of the first motor 310 to the third motor 330 rotates, the three first stoppers 810 can rotate respectively centered around the first axis A1 to the third axis A3. The first stopper 810 may serve to limit a rotation angle of each of the first frame 510 to third frame 530.

For stable operation of the gimbal device 1000, the rotation angle of the first frame 510 to the third frame 530 may be limited. In this embodiment, the maximum rotation angle of the first frame 510 to the third frame can be 170 degrees to 175 degrees.

Accordingly, the first stopper 810 may limit the rotation angle of each frame. The first stopper 810 includes a first protrusion 811 protruding in a radial direction, and the first protrusion 811 together with a second stopper 820 formed corresponding thereto, may limit the rotation angle of each frame. The first stopper 820 may be formed in a circular shape from an upper side of the first motor 310. Further, the first stopper 820 may be provided with a protrusion 811 protruding outward from one side of the outer circumferential surface of the first stopper 810.

Referring to FIG. 8, a second stopper 820 corresponding to a first stopper 810 provided in the first motor 310 may be provided in the mounting member 110. That is, the second stopper 820 may be provided at a portion of the mounting member 110 corresponding to the first protrusion 811 in the circumferential direction of the first stopper 810.

A through hole 821 through which the first stopper 810 penetrates may be formed in the mounting member 110. The through hole 821 may include a separate extension hole 822 so that the first stopper 810 and the protrusion 811 pass through.

Accordingly, when the first stopper 810 is rotated according to the rotation of the rotor 2200, the protrusion 811 may be guided by the second stopper 820. That is, when the protrusion 811 rotates, free rotation is possible in an area not in contact with the second stopper 820, but rotation of the rotor 2200 may be prevented when the second stopper 820 is in contact with the second stopper 820. Due to this, a radius of rotation of the rotor 2200 may be set.

Meanwhile, the second stopper 820 corresponding to the first stopper 810 provided in the second motor 320 and the third motor 330 is provided in the first frame 510 and the second frame 520, respectively.

Figure 12:
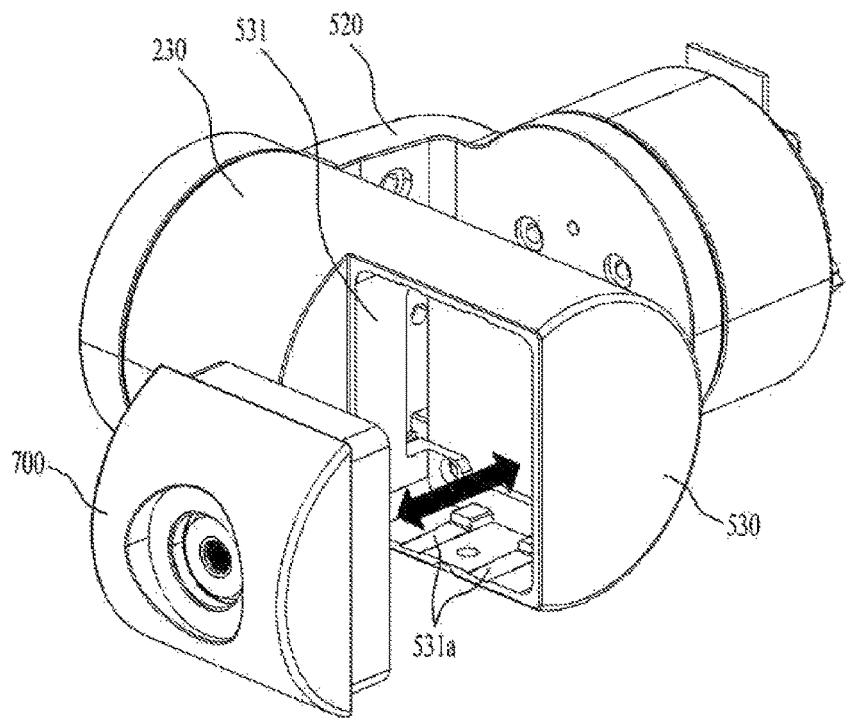
FIG. 12 is a view for explaining the structures of a third frame and a camera according to an embodiment of the present invention.

FIG. 12 is a diagram illustrating a structure of a third frame and a camera according to an embodiment of the present invention. As illustrated in FIG. 12, the camera 700 may be provided to be detachably attached to the third frame 530.

To mount the camera 700, a mounting groove 531 is formed in the third frame 530, and a portion of the camera 700 may be provided in a shape corresponding to the shape of the mounting groove 531.

Meanwhile, in order to ensure that the camera 700 is easily mounted on the third frame 530, a rail groove 531a may be formed in the mounting groove 531. The camera 700 may have a rail formed in a shape corresponding to the rail groove 531a, and the rail of the camera 700 is mounted on the rail groove 531a, so that the camera 700 can be mounted stably on the third frame 530.

Meanwhile, a circuit board electrically connecting the camera 700 and the driver 100 may be disposed on the third frame 530. A socket (not shown) for electrical connection between the circuit board and the camera 700 may be formed on each of the circuit board and the camera 700.

Since these sockets are provided to be detachable from each other, when the camera 700 is mounted on the third frame 530, the circuit boards disposed on the camera 700 and the third frame 530 can be electrically connected to each other by the sockets.

Meanwhile, in order to stably couple the camera 700 to the third frame 530, fastening fixtures such as bolts, screws, and the like for fixing the camera 700 and the third frame 530 may be used. In order to couple such fastening fixtures, for example, a screw hole may be formed in the third frame 530.

Figure 13:
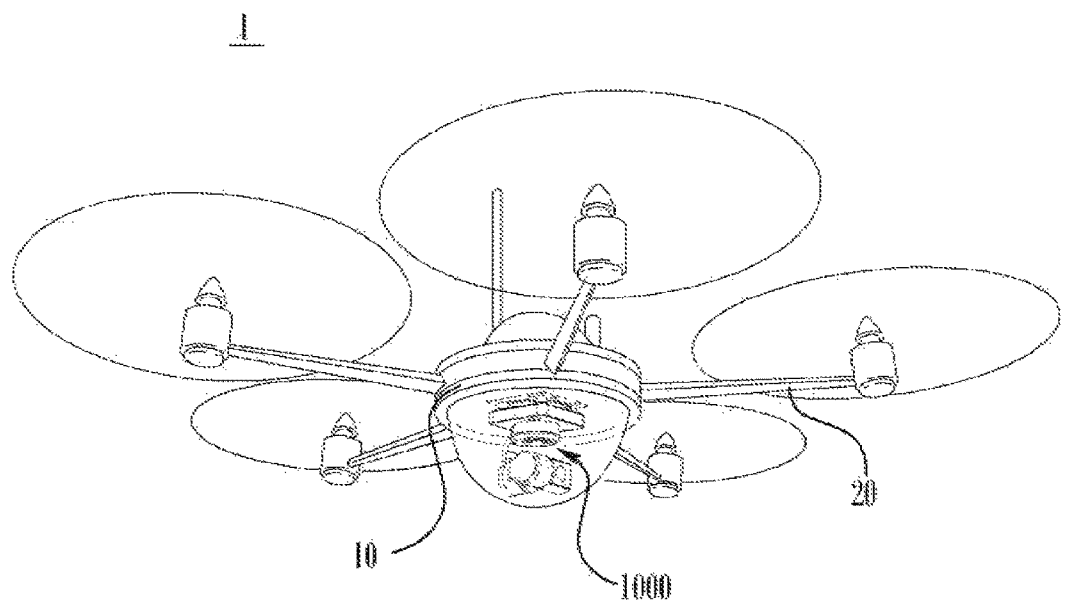
FIG. 13 is a perspective view of a flying apparatus according to the present embodiment.

FIG. 13 is a perspective view of a flying apparatus according to the present embodiment.

Referring to FIG. 13, the flying apparatus 1 may be an unmanned drone. The user can control the flying apparatus 1 by a wireless terminal (not shown). The flying apparatus 1 may include a main body 10, a prime mover unit 20, a gimbal device 1000, and an electric control unit (ECU).

The main body 10 is an exterior member, and the prime mover unit 20 may be disposed on one side of the main body 10, and the gimbal device 1000 may be disposed on the other side (lower side) of the main body 10. In addition, an electronic control unit (ECU, not shown) may be disposed inside the main body 10.

The prime mover unit 20 may be a plurality of propeller units disposed symmetrically with respect to the central axis in the vertical direction of the main body 10. The main body 10 can fly by the rotation of the propeller.

The gimbal device 1000 may be disposed at a lower side of the main body 10. The gimbal device 1000 may control the posture of a camera module 400 according to the shaking of the main body 10. Accordingly, the camera module 400 may perform photographing in an upright state.

The electronic control unit can wirelessly communicate with a wireless terminal controlled by a user. The electronic control unit may be electrically connected to various electronic components of the flying apparatus 1 and the gimbal device 1000. The electronic control unit wirelessly communicates with a wireless terminal controlled by a user, receives various control signals, and transmits them to various electronic components and the gimbal device 1000, thereby controlling the electronic components and the gimbal device 1000.

As an example, the electronic control unit may rotate the camera 700 by controlling the gimbal device 1000 according to a command of a user through a wireless terminal. As a result, the photographing range of the camera 700 may be changed to a point desired by the user.

The electronic control unit is electrically connected to the gimbal device 1000, receives various electromagnetic signals, analyzes and determines them and thereby controls the gimbal device 1000.

As an example, when shaking due to flight occurs, the electronic control unit receives the posture of the camera 700 from the sensor as an electromagnetic signal analyzes and determines it, and controls the driving unit 100 accordingly, thereby controlling the camera 700 to be rotated in the opposite direction in which the shaking occurs (shaking cancellation). As a result, the camera 700 performs photographing while maintaining an erect posture regardless of shaking, thereby improving photographing quality.

Hereinafter, it is assumed that the electronic control unit is disposed on the main body 10, but it should be noted that it has various types of arrangements. For example, the electronic control unit, that is, the main substrate may be disposed in the form of a chip on the driving unit 100 of the gimbal device 1000, or may be divided and disposed on each of the main body 10 and the driving unit 100.

In the above, even though all the components constituting the embodiments of the present invention are described as being combined into one or operating in combination, the present invention is not necessarily limited to these embodiments. That is, within the scope of the object of the present invention, all the components may be selectively combined and operated in one or more. In addition, the terms 'comprise (or include)', 'consist of', or 'have' described above mean that the corresponding component can be present unless otherwise stated, so it should be construed that other components may be further included rather than excluding other components. All terms, including technical or scientific terms, have the same meaning as commonly understood by those of ordinary skill in the art, unless otherwise defined. Terms commonly used, such as terms defined in the dictionary, should be interpreted as being consistent with the meaning of the context of the related technology, and are not interpreted as ideal or excessively formal meanings unless explicitly defined in the present invention.

The above description is merely illustrative of the technical idea of the present invention, and those of ordinary skill in the art to which the present invention belongs will be able to make various modifications and variations without departing from the essential characteristics of the present invention. Accordingly, the embodiments disclosed in the present invention are not intended to limit the technical idea of the present invention, but to explain the technical idea, and the scope of the technical idea of the present invention is not limited by these embodiments. The scope of protection of the present invention should be interpreted by the following claims, and all technical ideas within the scope equivalent thereto should be construed as being included in the scope of the present invention.

The invention claimed is:

1. A gimbal device comprising:
   a driving unit in which a main board is disposed;
   a first housing coupled to the driving unit;
   a first motor disposed inside the first housing; and
   a first connection unit electrically connected to the first motor, wherein the first connection unit includes:
      a first region extending in a first circumferential direction along an outer circumferential surface of the first motor;
      a first bent region bent from the first region; and
      a second region extending from the first bent region in a second circumferential direction, and
   wherein one of the first circumferential direction or the second circumferential direction is a clockwise direction and the other is a counterclockwise direction,
   wherein the first housing includes a first protrusion protruding from a bottom surface of the first housing on which the first motor is disposed and the first protrusion coupled to an inner circumferential surface of the first bent region.

2. The gimbal device according to claim 1, wherein the first connection unit includes a second bent region bent from the second region and a third region extending in the first circumferential direction from the second bent region.

3. The gimbal device according to claim 2, wherein the first housing includes a second protrusion coupled to an inner circumferential surface of the second bent region.

4. The gimbal device according to claim 3, wherein the linear distances from the first protrusion and the second protrusion to the first motor are different.

5. The gimbal device according to claim 1, wherein a portion of the outer circumferential surface of the first motor is not overlapped with the first connection unit in a radial direction of the first motor.

6. The gimbal device according to claim 1, comprising a first frame including a second housing and a second motor disposed in the second housing, and having one end coupled to the first housing and the other end coupled to the second housing.

7. The gimbal device according to claim 6, wherein the first frame rotates in a first direction according to operation of the first motor.

8. The gimbal device according to claim 6, wherein one end of the first connection unit is electrically connected to the driving unit, and the other end is electrically connected to the second motor.

9. The gimbal device according to claim 8, wherein the first connection unit is not exposed to an outside by the first housing and the first frame.

10. The gimbal device according to claim 1, wherein the second region is longer than the first region.

11. A gimbal device comprising:
    a driving unit in which a main board is disposed;
    a first housing coupled to the driving unit;
    a first motor disposed inside the first housing;
    a first connection unit electrically connected to the first motor;
    a first frame including a second housing and a second motor disposed in the second housing, and having one end coupled to the first housing and an other end coupled to the second housing; and
    a second connection unit electrically connected to the second motor,
    wherein the first connection unit includes:
       a first region extending in a first circumferential direction along an outer circumferential surface of the first motor;
       a first bent region bent from the first region; and
       a second region extending from the first bent region in a second circumferential direction, and
    wherein one of the first circumferential direction or the second circumferential direction is a clockwise direction and the other is a counterclockwise direction,
    wherein the second connection unit includes:
       a fourth region extending in a third circumferential direction along an outer circumferential surface of the second motor;
       a third bent region bent from the fourth region; and
       a fifth region extending in a fourth circumferential direction from the third bent region, and
    wherein one of the third circumferential direction or the fourth circumferential direction is a clockwise direction and the other is a counterclockwise direction.

12. The gimbal device according to claim 11, comprising:
    a third housing; and
    a third motor disposed inside the third housing, wherein a second frame is to connect the second housing and the third housing.

13. The gimbal device according to claim 12, comprising:
a third connection unit electrically connected to the third motor,
wherein the third connection unit includes:
- a seventh region extending in a fifth circumferential direction along an outer circumferential surface of the third motor;
- a fifth bent region bent from the seventh region; and
- an eighth region extending in a sixth circumferential direction from the fifth bent region, and
- wherein one of the fifth circumferential direction or the sixth circumferential direction is a clockwise direction and the other is a counterclockwise direction.

14. The gimbal device according to claim 12, wherein the first to third connection units are flexible circuit boards.

15. The gimbal device according to claim 12, wherein the second frame rotates according to operation of the second motor.

16. A flying apparatus comprising:
a main body;
a prime mover unit disposed on one side of the main body and supporting the main body; and
a gimbal device disposed on the other side of the main body,
wherein the gimbal device includes:
- a driving unit on which a main substrate is disposed;
- a first housing coupled to the driving unit;
- a first motor disposed inside the first housing; and
- a first connection unit electrically connected to the first motor, wherein the first connection unit includes:
- a first region extending in a first circumferential direction along an outer circumferential surface of the first motor;
- a first bent region bent from the first region; and
- a second region extending from the first bent region in a second circumferential direction, and
- wherein one of the first circumferential direction or the second circumferential direction is a clockwise direction and the other is a counterclockwise direction;
- wherein the first housing includes a first protrusion protruding from a bottom surface of the first housing on which the first motor is disposed and the first protrusion coupled to an inner circumferential surface of the first bent region.

17. The flying apparatus according to claim 16, wherein the first connection unit includes a second bent region bent from the second region and a third region extending in the first circumferential direction from the second bent region.

18. The flying apparatus according to claim 17, wherein the first housing includes a second protrusion coupled to an inner circumferential surface of the second bent region.

19. The flying apparatus according to claim 16, comprising a first frame including a second housing and a second motor disposed in the second housing, and having one end coupled to the first housing and the other end coupled to the second housing.

20. The flying apparatus according to claim 16, wherein the second region is longer than the first region.

* * * * *